United States Patent [19]

Tsunoda et al.

[11] 4,046,684
[45] Sept. 6, 1977

[54] PROCESS FOR THE TREATMENT OF A COLLOIDAL SUSPENSION

[75] Inventors: Shogo Tsunoda; Katsuyuki Kataoka, both of Yokohama, Japan

[73] Assignee: Ebara Infilco Kabushiki Kaisha, Tokyo, Japan

[21] Appl. No.: 686,197

[22] Filed: May 13, 1976

Related U.S. Application Data

[63] Continuation-in-part of Ser. No. 481,947, June 21, 1974, abandoned.

[51] Int. Cl.$^2$ ............................................. C02B 1/20
[52] U.S. Cl. ...................................... 210/20; 210/49; 210/51; 210/53; 210/54
[58] Field of Search .................. 210/20, 42, 49, 51–54, 210/205, 206, 208, 219, 221 M, 536

[56] References Cited

U.S. PATENT DOCUMENTS

| | | | |
|---|---|---|---|
| 3,350,302 | 10/1967 | Demeter et al. | 210/51 |
| 3,377,274 | 4/1968 | Burke et al. | 210/53 |
| 3,403,096 | 9/1968 | Mackrle et al. | 210/20 |
| 3,481,868 | 12/1969 | Gilwood | 210/20 |
| 3,579,443 | 5/1971 | Horst | 210/219 |
| 3,637,491 | 1/1972 | Hedrick | 210/54 |
| 3,642,619 | 2/1972 | Lasasso et al. | 210/52 |
| 3,660,284 | 5/1972 | Camp | 210/49 |
| 3,730,887 | 5/1973 | Suzuki et al. | 210/49 |
| 3,779,910 | 12/1973 | Chatfield | 210/49 |

Primary Examiner—Wilbur L. Bascomb, Jr.
Assistant Examiner—Peter A. Hruskoci
Attorney, Agent, or Firm—Blum, Moscovitz, Friedman & Kaplan

[57] ABSTRACT

A solid-liquid separation process is provided for clarifying water containing colloidally-suspended solids such as clay, metal minerals and hydroxides, organic and inorganic materials and like substances wherein the solids concentration in the mother liquor is less than 10 g/l. The colloidally-suspended solids are converted to a coagulum of substantially spherical particles characterized by a high density and large particle size and generally exhibit different properties than the flocs thereof. The coagulum separates from a supernatant at about 5 to about 10 times the precipitation rate of a floc treated according to a conventional flocculation-precipitation method. The resulting sludge exhibits superior condensability and is extremely suitable for treatment by a hydroextraction technique. The water obtained from the treatment is unusually clear and free of suspended matter. Apparatus for carrying out said process is described, said apparatus including stirrers for introducing shear energy within specified critical limits.

13 Claims, 2 Drawing Figures

4,046,684

PROCESS FOR THE TREATMENT OF A COLLOIDAL SUSPENSION

CROSS-REFERENCE TO RELATED APPLICATION

The present application is a Continuation-In-Part of our co-pending Application Ser. No. 481,947 filed June 21, 1974, now abandoned for A PROCESS FOR THE TREATMENT OF A SUSPENSION. The present application is related to co-pending Application Ser. No. 686,195, filed May 13, 1976 for SUSPENSION SEPARATION PROCESS AND APPARATUS.

BACKGROUND OF THE INVENTION

This invention relates to a novel process for solid-liquid separation of contaminants, colorants and other solid suspended matter from a colloidal-suspension to yield a clarified effluent and an apparatus therefor.

According to conventional methods for the separation of solids suspended in a suspension, an inorganic metal salt flocculating agent, for instance, aluminum sulfate or ferric chloride is added to the suspension so as to flocculate colloidal particles, of the suspended matter, promote coagulation of the flocced particles and increase the precipitation rate thereof so as to facilitate separation of the solids from the suspension.

When the precipitation rate of the solids is to be increased, conventionally an organic high molecular weight flocculating agent is incorporated in the suspension to increase the coagulum of flock and thus accelerate the precipitation rate thereof.

However, floc particles of the colloidally suspended solids thus formed in accordance with these customary methods do not exhibit strong coalescent bonds between particles themselves, they are excessively hydrated, have a low density, and concomitant slow precipitation rate in spite of the bulk and size of floc particles thereof. It is a further disadvantage of these prior processes that the floc particles produced therefrom are inadequately dehydrated. In consequence of the foregoing, none of these conventional processes have satisfactory hydroextraction properties. Furthermore, the quality of the water obtained is poor.

To overcome the shortcomings of these conventional processes, it has been proposed to treat a highly concentrated suspension, viz., a pre-treatment process for a sludge comprising feeding a suspension containing suspended solids at a concentration of 10 g/l - 500 g/l into a vessel, adding thereto a high molecular weight flocculating agent, for instance, a high molecular weight polyacrylamide, a partially hydrolyzed compound thereof and sodium polyacrylate, in the amount of at least 0.2 g-polymer pre kg-solid, maintaining the concentration of the suspension inside the vessel at 30 - 500 g/l, and rotating the suspension at an outer peripheral speed of 0.5 - 3 m/sec so as to granulate the suspended solids and separate them from the mother liquor.

According to the described method, the suspended solids agglomerate into mass of finely divided particles, thereby ensuring an improved dehydration and exhibiting satisfactory hydroextraction properties. This method, however, is not free from major problems yet to be remedied. Namely, the method is not effectively applicable to a suspension having a solids concentration less than 10 g/l.

In accordance with this prior method, agglomerated finely divided particles are not formed in a suspension wherein the solids concentration is less than 10 g/l. In the past, it has therefore, been necessary in practicing this method to employ conjointly therewith a dehydration-precipitation procedure to thereby flocculate the colloidal solids and separate condensate therefrom by increasing the solids concentration to 10 g/l or more. Accordingly, this prior modified method is impractical for treating a mother liquor containing a relatively small quantity of colloidally-suspended solids wherein the solids concentration is less than 10 g/l, such as, for instance, may be formed in river water, lake water and the like. Furthermore, the method does not provide for separation of granulated particles from supernatant so that a clarified elluent does not result.

As is evident therefore, a method for granulating a colloidal suspension at low cost and providing a clarified effluent free of the colloidally-suspended particles would be highly desirable.

SUMMARY OF THE INVENTION

Generally speaking, a solid-liquid separation process is provided for separating colloidally-suspended solids such as clay, metal minerals and hydroxides, color materials, BOD, COD, organic and inorganic materials and like substances from a mother liquor wherein the solids concentration is less than 10 g/l and for yielding a clarified effluent of low impurity content.

The conversion involves the addition of an inorganic metal salt flocculating agent to destabilize and coagulate the colloidal suspension followed by the addition of an organic, high molecular weight flocculating agent after a suitable time interval and subjection of the resultant suspension to shear within a critical range of energy input. The suspended solids are agglomerated to a coagulum of substantially spherical particles characterized by a high density, large particle size and generally exhibit different properties from the flocs thereof, said flocs being formed by the addition of the inorganic metal salt flocculating agent. The coagulum separates from a supernatant at about 5 to about 10 times the precipitation rate of a floc treated according to a conventional flocculation-precipitation method. The resulting sludge exhibits superior condensability and is extremely suitable for treatment by a known hydroextraction technique.

It is, therefore, a principal object of the invention to provide a method for separating a substantially low concentration of suspended solids from a colloidal suspension.

It is another object of the invention to provide a method for separating colloidally-suspended solids from the mother liquor of a suspension wherein the solids concentration is below 10 g/l.

Yet another object of the invention is to provide a process for the separation of colloidally-suspended solids from the mother liquor of a suspension by a process which proceeds at about 5 to 10 times the separation rate of a conventional flocculation-precipitation process, and provides a highly condensable sludge which may be treated by any known hydroextraction technique with excellent results.

A further object of the invention is to provide a process for the treatment of a suspension employing a simple and economical apparatus, wherein a residual high molecular weight flocculating agent of the type commonly employed in conventional methods is substantially eliminated from the treated suspension, and the dehydration properties of the resulting sludge as well as the treatment efficiency thereof, are substantially improved even without the use of a sand filtering device of the type heretofore required in the post-treatment of conventional flocculation-precipitation methods so as to prevent possible secondary pollution.

An important object of the present invention is to provide a process for producing a highly clarified effluent of low impurity content from a mother liquor containing less than 10 g/l of colloidally-suspended solids.

Still other objects and advantages of the invention will, in part, be obvious and will, in part, be apparent from the specification.

The invention accordingly comprises the several steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
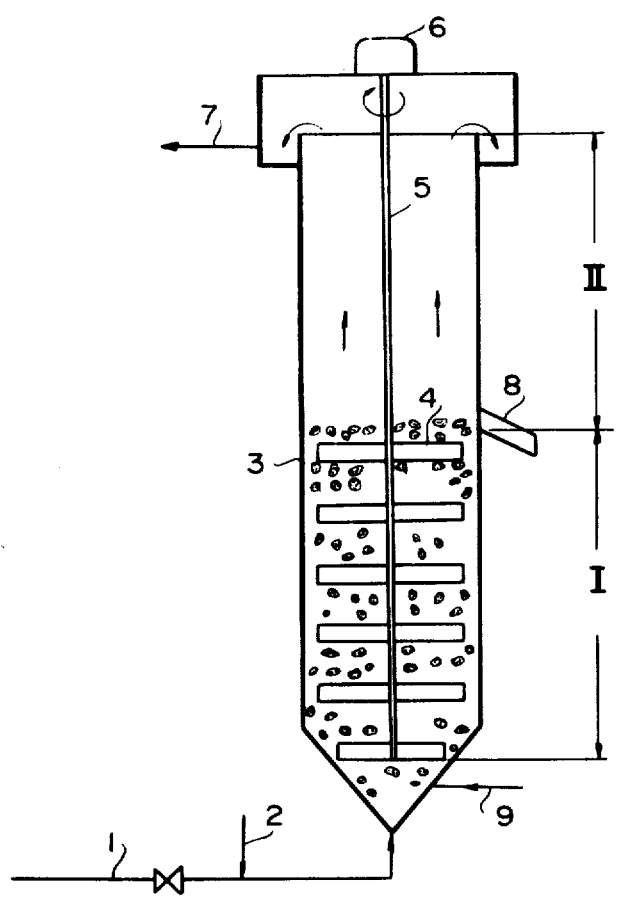
FIG. 1 is a schematic drawing which depicts one embodiment within the scope of the instant invention.

The water clarification and purification and solids-separation process comprises adding a small, but effective amount of an inorganic metal salt flocculating agent to a colloidal suspension having a solids concentration which is less than 10 g/l, the amount of inorganic metal salt flocculating agent added to the suspension being sufficient to destabilize the colloidal suspension to initiate coagulation of the colloidally-suspended solids into small particles termed microflock. Before metal ions of the salt substantially completely hydrate to the corresponding hydroxides, at least 0.5 ppm of an organic high molecular weight flocculating agent is added to the suspension to convert the microfloc into strongly bonded large particles. The treated suspension is subjected to agitation, and preferably to agitation of the type which imparts simultaneously an upward and rotational flow to the mass of suspended particles for thereby effecting intimate particle-liquid contact, whereby the particles granulate. The granulates formed thereby are collected. The liquid phase of the suspension is separated as a supernatant from the solids as the suspension moves upwardly; the solids suspended therein are extracted as granules which can be condensed into a cake, and a purified supernatant may also be collected.

In the specification and claims that follow, the expression "inorganic metal salt flocculating agent" is defined as a reagent that promotes instability in a colloidal suspension, and for convenience will be termed "IFA." Suitable inorganic metal salt flocculating agents within the scope of the definition and which may be employed in the instant process include aluminum sulfate, polyaluminum chloride, ferric sulfate, ferric chloride, ferrous sulfate and magnesium carbonate.

Likewise, in the specification and claims that follow, the expression "organic high molecular weight flocculating agent" for convenience, shortened to "OFA," is defined to include the class of reagents which promotes strong bonding between suspended particles by the reaction thereof with the defined IFA class under specific process conditions. Suitable OFA within the scope of the definition which may be employed in the instant invention include polyacrylamide, a partially hydrolyzed compound of said polyacrylamide, sodium polyacrylate and like agents known to those skilled in the art.

In the instant process, it is found that there is a specific correlation between the molecular weight of the OFA and the granulation of the suspended solids. For effective granulation of the suspended solids, the molecular weight of the OFA must be at least 500,000 or more. When the molecular weight thereof exceeds 1,000,000, granulation is more effective, and at molecular weights of between about 5 and 6 million, the OFA promotes excellent granulation of suspended particles. Accordingly, an OFA must be employed in connection with the invention, and the molecular weight thereof must be at least 500,000, and preferably at least 1,000,000. Most preferably, the molecular weight of the OFA is in the range of about 5 to about 6 million.

In the practice of the instant process, a granulation-separation apparatus is employed which includes a substantially cylindrical vessel, a feed conduit connected to the lower section thereof for feeding a mother suspension liquor under pressure into the vessel, a charge conduit connected to the feed conduit for charging the suspension liquor with a preselected flocculating agent, means for agitating and granulating respectively the mother liquor and particles suspended therein, the means being located in a lower section of the vessel, an overflow pipe connected proximate or above the top of said granulating section thereof for removing the coagulated particles from the treated mother liquor, said vessel including a section for the collection of supernatant clarified liquid disposed above the section in which agitation and granulation occur.

Referring now to FIG. 1, an apparatus for treating a mother liquor suspension containing colloidally suspended solids according to the invention is shown. The suspension is carried through a feed pipe 1, admixed with an optimum amount of an IFA which is fed into the suspension through a charge pipe 2, and the admixture is charged into the granulation-separation section of a vessel 3 and charged therein with an upward flow. The quantity of IFA added is usually in the range from 5–300 ppm.

The IFA is added first in order to destabilize the colloidal-suspension and to cause coagulation of the solids in said suspension. The OFA is added in an amount between 0.5 ppm and 20 ppm immediately after the completion of the coagulation. If the OFA is added too soon, reaction between the IFA and OFA takes place more rapidly than the rate of coagulation of the suspended solids by the IFA so that at least a portion of the colloidally-suspended solids remain in suspension and consequently are uncoagulated. The IFA coagulates the colloidal suspension into a suspension of microflocs as aforenoted. In general, the interval between addition of the IFA and the OFA is from 5 seconds to 4 minutes, and is preferably from 10 seconds to 3 minutes. The timing of the addition interval is a critical factor in the success of the operation. When the timing is correct, the microfloc formed initially by the coagulation step grows during agitation to larger and larger floc, eventually forming granules. According to the present invention, the OFA is added without allowing the microfloc to grow by itself. The interval between addition of the two coagulating agents depends on the particular suspension to be treated, the quality of the water, the size and shape of the vessel in which the suspension is to be treated, the method of agitation and the strength of agitation. These factors will be discussed in more detail. Should the reaction time between the successive additions be too great, the microfloc produced is extremely weak and is cotton-like in structure; this is the type of floc that is formed in accordance with the prior art. However by the use of two coagulating agents in the sequence described herein, it becomes possible to form granules of substantial strength in a compact apparatus. Moreover, the conventionally-used coagulating bath is not necessary.

The time interval between addition of the IFA and the OFA can be controlled by sizing the conduit 1 appropriately, controlling the rate of flow of the mother liquor through conduit 1, by positioning the conduit 9 for introduction of the OFA appropriately at the side of vessel 3 or by introduction of a vessel (not shown) in conduit 1 between charging conduits 2 and 9.

The vessel 3 is interiorly partitioned into sections, the lowermost section being the granulation section generally designated by the numeral I and the uppermost section being the supernatant section generally designated by the numeral II. In granulation section I, there is provided a rotary shaft 5 having a plurality of paddle-like multi-stage stirring blades 4 connected thereto for generating a rotational motion in the suspension, the blades being driven at a predetermined speed by a driving means 6 operatively connected to rotary shaft 5. The mother-suspension liquor, charged and admixed with the IFA is charged into the granulation section I through the bottom of vessel 3. After a suitable time interval established by the fluid flow rate and the dimensions of the apparatus, an OFA is charged into granulation section I through a feed pipe 9 at a concentration of between 0.5 ppm and 20 ppm. The high molecular weight flocculating agent and inorganic flocculating agent previously fed into the suspension through charge pipe 2 react and multiply the bonds of attraction between floc particles.

A coagulum of suspended particles is formed in granulation section I of vessel 3, while the supernatant flows upwardly into supernatant section II of vessel 3 from which it may be discharged through an outlet port provided in vessel 3 into a discharge pipe 7 for treated liquid.

Within granulation section I, the suspended solids are shaped into substantially substantially spherical particles by the shear induced by impellers 4. The overflow thereof is removed from granulation section I through an overflow outlet port 8 arranged at the upper portion of granulation section I.

In the practice of granulation in accordance with the process of the present invention, there are two critical factors. The first is the aforenoted chemical treatment of the mother liquor and the other is the specific type of agitation employed for effecting intimate particle-liquid contact, i.e., simultaneous upward and rotational flows. These two factors in the process of the present invention ensure strong bonding among the suspended solids and the formation of finely divided substantially spherical particles.

Impellers 4 consist of flat blades lying in a vertical plane, the impellers being mounted on a rotatable shaft 5 driven by a motor 6. The tip speed of the impellers is from about 0.05 to about 0.7 m/sec. A critical factor in the operation of granulator-separator apparatus as shown in FIG. 1 is the agitation strength or energy input by means of the impellers during rotation. The agitation by means of the impellers is primarily directed to imparting a shearing force to the fluidized particles and thereby to cause their consolidation. For this reason, the intensity of the agitation cannot be expressed only in terms of the peripheral velocity of the impellers; a more pertinent characteristic is the agitation strength or G-value which is the energy consumed per unit volume per second. For the secondary treated water of sewage containing colloidally-suspended matter, the G-value should lie in the range of 0.001 - 1.0 kg-m/m$^3$ sec.

According to the usual result of the process described herein, a blanket layer forms up to the level of the overflow conduit 8. At the lowest levels of agitation, the blanket layer becomes similar to the conventional layer in that the granules are relatively weak. If the agitation level is too great, the impellers become destructive of the blanket, forming cleared regions in the blanket through which upwardly flowing fluidized particles can move so that they fail to come in contact with the larger particles in the blanket layer. As a result, some of these particles may pass into the conduit 7, greatly decreasing the effectiveness of the apparatus and the process.

Figure 2:
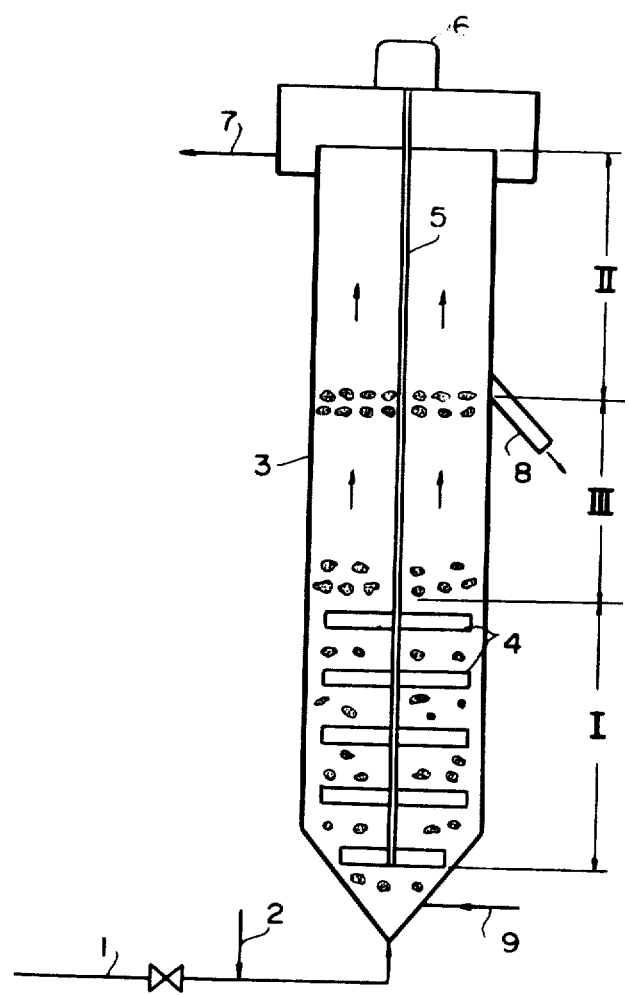
FIG. 2 is a schematic drawing which depicts another embodiment within the scope of the invention.

FIG. 2 illustrates another embodiment of the present invention wherein the granulation-separation apparatus comprises a granulation section I, an expansion section III for granulated particles and a supernatant section II. This apparatus and process embodiment is characterized by a substantial stationary layer of granulated particles overlying the granulation section. By this arrangement, finely divided particles flowing out of the granulation section are collected by the stationary blanket layer acting as a filtration means to thereby ensure complete collection of the particles and provide a supernatant free of such particles.

In practicing the process with either the apparatus shown in FIG. 1 or 2, the rate at which the inorganic metal salt flocculating agent is fed into the mother liquor is dependent largely upon the properties of the mother liquor and the content of colloidally-suspended material. An optimum rate is to be experimentally determined for each mother suspension. The feeding rate, for example, varies principally with the concentration of colloidally-suspended solids, and the feed rate generally should be decreased when the concentration thereof is low and increased as the concentration thereof increases. Generally, the IFA should be fed into the mother suspension at a rate sufficient to provide a concentration thereof in the suspension of from about 5 to about 300 ppm.

Similarly, the rate at which the OFA is fed into the resultant microfloc suspension depends on the properties of the mother suspension and an optimum rate is to be experimentally determined by performing a scaled fluidification-granulation experiment with a sample of the mother suspension. Also, the feed rate of organic high molecular weight flocculating agent into the mother suspension is dependent upon the amount of IFA added to the suspension, and the amount of OFA is proportionally increased as the amount of IFA in the mother suspension is increased. Usually, the feed rate of OFA is adjusted to provide a concentration thereof of from about 0.5 to about 20 ppm in the mother suspension.

To obtain satisfactory granulation according to the instant process, it is preferred to increase the concentration of suspended solids at least threefold over the concentration thereof in the untreated mother suspension liquor. In other words, in the granulation-separation apparatus of the present invention, the lower limit of the internal concentration within the blanket layer must be maintained at about at least 3 times higher than the concentration of the suspended solids in the mother suspension liquor, otherwise granulation and separation do not satisfactorily occur. Generally, satisfactory results are achieved when the solids concentration is within the range of from about 1 g/l to about 150 g/l.

The upward flow rate also substantially influences the above-mentioned critical internal concentration within the granulation section. Therefore, the upward flow rate must be adjusted to satisfy the critical solids concentration level. The upward flow rate is also dependent upon the type of mother suspension liquor to be treated. In a granulation-separation apparatus of the type illustrated in FIGS. 1 and 2, satisfactory results are obtained when the suspension upward flow rate is adjusted to from about 200 mm/min to about 2,000 mm/min. However, the optimum upward flow rate is to be experimentally determined for each suspension.

The speed of the impellers varies also with types of mother suspensions. In the apparatus of the present invention, preferably, the speed of the impellers at the distal end, i.e., the tip speed, is from about 0.05 to about 0.7 m/sec. When the impellers rotate too fast, collisions among suspended particles accelerate and suspended solids are driven from the granulation section of the apparatus thereby lowering the solids concentration therein. However, when the impellers rotate too slowly, the suspended solids tend to agglomerate. Accordingly, the optimum rotational speed is experimentally determined for each individual mother suspension liquor by performing a scaled preparative experiment.

When the process of the present invention is employed to separate out colloidally-suspended solids from the mother suspension liquor by the usual process, where the suspended material is particularly hydrophilic, the resultant granulated particles are too wet and cannot be formed into finely divided particles, as required. This problem may be overcome by increasing the amount of organic high molecular weight flocculating agent charged into the suspension and when the amount thereof is sufficiently increased, satisfactory granulation occurs. However, the large increase in the amount of flocculating agent required increases the cost of processing the suspension and is, therefore, an economic disadvantage.

In such instances, where it is desired to process such unusually-hydrophilic colloidally-suspended solids, waterinsoluble finely-divided particles having a specific gravity of 1.0 or more and a particle size of not larger than 200 microns are initially added to and dispersed in the mother suspension liquor prior to addition of the IFA to coalesce the finely divided particles into the resulting floc. The OFA is thereafter added to the suspension to carry out granulation of the suspended solids therein in the apparatus. According to this procedure, hydrophilic suspended solids are formed into finely divided particles without substantially increasing the process costs.

The granulated coagulum of these finely divided particles precipitates rapidly. The dispersed hydrophobic particles provide the granulated particles with a hydrophobic character. Accordingly, this procedure may be employed to obtain satisfactory dehydrated solids.

While the above-described method is specifically effective for the granulation of highly hydrophilic suspended particles, it is not required for treating clay-type suspended particles to obtain the separation thereof.

When the finely divided hydrophobic particles employed have a particle size of about 30 – 200 microns, they can be regenerated and recycled to the system by passing the granulated particles through a wet-type cyclone or the like. As specific examples of the finely divided particles that can be used for the above-mentioned purpose are included sand, clays, finely divided carbon, activated carbon, fly ash or powders of synthetic resins. Any other solid particles can be used so long as they are hydrophobic, insoluble and have a specific gravity of more than 1.0.

The quantity of hydrophobic finely divided particles to be added to the suspension varies with the concentration of the suspended particles in the mother suspension, and is generally increased proportionately therewith. Usually, the amount to be added is about 10% or more, based upon the amount of the suspended particles in the suspension.

Examples 1 through 5 illustrate values of the process parameters and apparatus parameters which successfully granulate the colloidally-suspended solids and result in a clear supernatant liquid which can be withdrawn from the apparatus. However, in order to establish criticality a number of tests were run at values of the parameters lying outside the ranges specified herein. In describing these tests, the tests will be labelled with a number corresponding to the appropriate Example followed by a letter.

EXAMPLE 1

To a suspension (pH 7.2) having a suspended-solids concentration of about 100 ppm of kaolin clay, about 10 ppm of alum (aluminum sulphate) was added and the treated suspension was subjected to agitation for about 15 seconds in a vessel. Immediately after the addition thereto of about 0.5 ppm of partially hydrolyzed polyacrylamide (having a molecular weight of about 5 million) as OFA, the treated suspension was introduced into the bottom of a cylindrical granulation-separation apparatus having a diameter of 100 mm and a height of 1200 mm provided with a granulation section 800 mm in height), a supernatant section (400 mm in height) and nine (9) shell-shaped stirringblades (Diameter = 80 mm, Height = 40 mm, Tip speed = 0.18 m/sec). The agitation strength within the granulation section I was 0.68 kg-m/m$^3$sec.

The suspension was moved upwardly at 700 mm/min; the treated water was found to contain 3 ppm of impurity.

The resulting granulated particles had a particle size of 2 – 2.5 mm, a density of 1.08 g/cm$^2$ and an internal concentration inside the granulation section of 62 g/l. The sludge thus formed was subjected to a hydroextraction procedure for one minute with a bucket-type centrifugal hydroextractor having a centrifugal effect of 230G to provide a cake having a moisture content of 48%.

To differentiate over conventional procedures, a portion of the same suspension was similarly treated in the apparatus, but about 10 ppm of alum was added thereto with agitation for about 5 minutes, and a polyacrylamide-type high molecular weight flocculating agent was introduced therein. However, no granulation of the particles was observed. An upward flow speed of 80 mm/min. was maintained and the contamination of the treated liquid was measured at about 7 ppm. The process merely performed in the manner of prior conventional flocculation-precipitation methods. The flock density inside the granulation section at this time was 2 g/l.

EXAMPLE 2

The apparatus employed for this Example had a diameter of 500 mm and a height of 2,000 mm, consisting of a 1,000 mm high granulation section with six stirring blades disposed therein having a diameter of 400 mm × 90 mm height, a 400 mm high expansion section and a 600 mm high supernatant section. The apparatus was operated at a rotational speed of 16 rpm (outer peripheral speed of 0.34 m/sec.) and at an upward flow rate of 600 - 700 mm/min. The agitation strength within the granulation section I was 0.84 kg-m/m³ sec.

To a clay-type suspension having a concentration of 200 ppm (in a proportion of kaolin to bentonite of 8 : 2) was added about 15 ppm ferric chloride. The treated suspension was stirred for about 20 seconds and immediately introduced into the bottom of the granulation section. An addition thereto of about 1.2 ppm polyacrylamide (having a molecular weight of 2 million) as OFA followed.

The process provided a stable supernatant that contained a suspended solids concentration of less than 2 ppm and the granulated particle size was 2 - 3 mm in diameter, and the internal concentration thereof inside the granulation section was 105 g/l.

The same procedure as set forth above was repeated except that the apparatus employed did not contain an expansion section. The resulting granulated particles, however, exhibited the same properties as in the above experiment, but the suspended solids concentration in the treated liquid this time was 5 - 7 ppm.

EXAMPLE 3

The apparatus employed for this experiment was a cylindrical vessel having a diameter of 100 mm and a height of 1200 mm comprising, in order from the bottom, an 800 mm high granulation section including 8 multi-stage shell-shaped impellers arranged therein having a tip-to-tip length of 80 mm and a height of 40 mm, and a 400 mm high supernatant section. The impellers were rotated at a tip speed of 0.2 m/sec. The agitation strength within the granulation section I was 0.042 kg-m/m³sec.

The pretreated water had a contamination of 40 ppm and a color value of 80 ppm. To this pretreated water was added about 100 ppm of finely divided carbon of less than 200 microns and 30 ppm polyaluminum chloride. The modified water was introduced into the bottom of the granulation section, and about 10 ppm sodium polyacrylate (molecular weight = 4 million) was added thereto to effect granulation.

The contamination level of the water was reduced by the above treatment to less than 5 ppm and the hue thereof was reduced to less than 20 ppm. The granulated particles thus formed had a maximum diameter of 2 - 3 mm and a spherical shape. The internal concentration within the granulation section was 50 g/l, and the upward flow speed was 700 mm/min.

The granulated particles were easily dehydrated by means of a roll-press. The resulting cake showed a moisture content of 65% and could also be burned in a furnace readily without any auxiliary fuels.

When the same procedure was repeated for the same pretreated water, the only difference being that finely divided carbon was not added, substantially similar results were observed, i.e., the concentration inside the granulation section (= 15 g/l), the contamination level (= less than 5 ppm) and the hue (= less than 20 ppm) of the treated water. As evident, the suspended solids were not unduly hydrophilic so that added hydrophobic material was not needed.

As compared with the prior procedure wherein finely divided carbon was added, however, the latter procedure provided a less satisfactory upward flow speed (= 400 m/min.) and the moisture content in the resulting cake after press rolling was about 80 - 85%.

TEST 1-A

A suspension having the exact composition as that set forth in Example 1 was treated in the apparatus of Example 1 and in precisely the same way as set forth in Example 1 except that the sequence of addition of the partially hydrolyzed polyacrylamide and alum was reversed.

The upward flow rate was 700 mm/min. Substantially no separation of suspension occurred in the granulation of supernatant sections of the apparatus, and the contamination level of the treated suspension was measured at 170 - 190 ppm. This measurement shows that substantially none of the colloidal solids in the mother suspension liquid were removed therefrom, and no sedimentation of flock from the mother liquid occurred. Also, no sludge layer was formed in and at the top of the granulation section.

The test was continued by reducing the upward flow rate in the suspension liquor to 250 mm/min from 700 mm/min, and the system was observed to determine the rate of sedimentation of flock and whether a formation of a sludge layer occurred. The rate of sedimentation of the flock was greatly reduced as compared with the results observed in Example 1 and no granulation of flock particles in the sludge layer occurred. The contamination in the supernatant layer was measured at 10 - 15 ppm.

From these tests it can be concluded that the process set forth in Example 1 does not result in purification of the suspension liquor when the sequence of addition of the flocculating agents is reversed. Also, reduction in the flow rate of the suspension under treatment to one-third of its optimum level to compensate for the reversal of the addition sequence reduces the separation of flock from the supernatant liquid to a very low rate, and the contamination level in the supernatant is appreciably higher than when the entire procedure of Example 1 is followed.

TEST 3-A

The procedure and apparatus of Example 3 were followed and used in exactly the same way except that the sequence of addition of the sodium polyacrylate and the polyaluminum chloride were reversed.

At an upward flow rate of 700 mm/min in the suspension, no sedimentation of solids from the suspension liquid occurred, the level of contaminants in the suspension liquid remained unchanged, and no sludge separation occurred.

The upward flow rate in the suspension liquor was then reduced to 250 mm/min from 700 mm/min. A sludge layer formed in the vessel, but the finely divided carbon particles did not agglomerate with the sedimented flock, and a discrete layer of the finely divided carbon particles formed in the lower part of the granulation section of the vessel.

From these tests, it is evident that the reversal of addition of the flocculating agents in the process set forth in Example 3 negates the effect usually obtained by adding finely divided carbon particles to a suspension of the composition disclosed in the Example 3. Furthermore, the level of contamination in the liquor was measured at 20 ppm and had a color value of 60 ppm, thereby demonstrating that the reversal of the addition sequence in the process increased the contamination level and hue in the processed water.

TEST 1-B

As a further test of the criticality of the process and apparatus as disclosed herein, the colloidal suspension described in Example 1 was treated in exactly the same way as described in said Example except that the impellers mounted in the vessel were held stationary, that is, the impellers were not rotated.

Under the conditions described, it was observed initially that the floc bridged and became immobile. Subsequently channels formed in the bridged floc and floc escaped from the granulation section of the vessel into the supernatant section of the vessel. Further, it was observed that colloidal solids suspended in the mother liquor were not entrapped in the sludge layer and, instead, proceeded into the supernatant section of the vessel, being carried over by the flowing liquid into conduit 7. The contamination level of the supernatant was measured at 70 - 85 ppm.

As a next stage of this test, the upward flow rate in the suspension liquid was decreased to 255 mm/min from 700 mm/min. The reduction in the upward flow rate did not result in any significant improvement in the effectiveness of the treatment.

As a further stage in the test, the quantity of partially hydrolyzed polyacrylamide added was reduced to 0.1 ppm and the upward flow rate in the suspension was decreased to 150 mm/min.

Under these conditions a fluidized sludge layer formed in the granulation section of the vessel and the liquid flowed upwardly in the vessel at a substantially uniform rate. However, the upward flow rate of the suspension liquor in the vessel was greatly reduced as compared with the flow rate in accordance with the usual procedure as presented in Example 1. The contamination level of the supernatant then dropped to an acceptable level of 3 - 5 ppm.

This level of contamination is substantially identical with the results usually obtained by conventional purification methods; however, contrary to the results achieved in Example 1, there was no granulation of the floc. Consequently, the floc was weak and highly hydrated.

From these results it can be concluded that in the absence of a rotational flow within the vessel it is not possible to add more than 0.5 ppm of OFA to the suspension liquor, and that the only way in which a fluidized sludge layer can be provided in the vessel for removing colloidal solids from the initial suspension when no rotational flow is imparted to the suspension liquor is to substantially reduce the amount of OFA added to the suspension liquor and, concomitantly to substantially reduce the upward flow rate of the suspension liquor in the treatment vessel. These variations in the procedure carry with them the substantial disadvantages that the separated floc does not granulate and the throughput of the apparatus is far lower when the process is carried out in accordance with the present invention

TEST-3-C

Pretreated water having the composition employed in Example 3 was put through the equipment under the same conditions described in Example 3. After stable conditions had been reached, rotation of the impellers was stopped. Shortly thereafter, the floc became non-fluid, the upward flow in the suspension caused channeling through the non-fluid floc, and floc dislodged by the channeling entered the supernatant section of the vessel. The contamination level in the supernatant liquid rose to a level of 100 - 200 ppm.

After the impellers had been stopped for a period of two hours, all of the floc which had accumulated in the granulation layer had dispersed upwardly through the system and only a layer of finely divided carbon particles remained in the granulation section of the vessel.

This test once more substantiates the fact that agitation is a critical feature of the invention and that without agitation there is no formation of a fluidized floc layer. Moreover, the floc layer that is initially formed prior to termination of the rotation of the impellers is dispersed. Finally, the floc layer that is formed does not granulate.

Following are further examples in accordance with the present invention:

EXAMPLE 4

A colloidal suspension obtained by the active sludge treatment of a digested, separated sewage liquid was diluted tenfold. Analysis of the liquid gave the following results:

pH, 7.6; suspended solids, 80 ppm; color value, 900 units; $COD_{Mn}$, 90 ppm; $BOD_5$, 25 ppm.

To the above colloidal suspension was first added 200 ppm of $FeCl_3$ and the suspension was agitated for 70 seconds to cause coagulation. Immediately thereafter 2.0 ppm of polyacrylamide flocculating agent having a molecular weight of 2,000,000, was added and the suspension was charged into the blanket layer of the vessel. The concentration in the blanket layer was maintained at 2 g/l and the upward flow rate was maintained at 250 mm/min. The outer peripheral velocity of the impeller was 0.08 m/sec. The water removed from the vessel had the following characteristics: pH, 6.6; suspended solids, 2.5 - 3 ppm; color value, 100 units; $COD_{Mn}$, 30; $BOD_5$, 3 ppm.

The agitation strength of the impellers was about 0.024 kg-m/m$^3$ sec in the granulation section (blanket layer).

The apparatus used for the experiment had an inner diameter of 500 mm, the height of the granulation section being 1,500 mm and the overall height being 2,500 mm. The impellers consisted of a four-stage paddle having a diameter of 400 mm and a height of 50 mm.

TEST 4-A

Conditions were maintained as in Example 4 except that the upward flow velocity was increased to 350 mm/min. The concentration within the granulation zone fell to below 1 g/l within 20 minutes. The quality of the supernatant liquid deteriorated drastically, and separation became difficult.

EXAMPLE 5

Secondary-treated water from sewage treatment was passed through a vessel containing an impeller having five 1.6 m wide and 100 mm high paddles in sequence.

The quality of the mother liquor initially was as follows:

pH, 7.0; suspended solids, 86 ppm; $COD_{Mn}$, 38 ppm; $BOD_5$, 44 ppm. 50 ppm of aluminum sulfate was added to the mother liquor and agitated for 80 seconds. Immediately thereafter 1.0 ppm of polyacrylamide flocculating agent having a molecular weight of 2.5 million was admixed thereto and the suspension was charged into the blanket layer of the vessel.

The apparatus was operated under conditions such as to maintain a concentration of 4 g/l within the blanket layer at an upward flow rate of 300 mm/min, the outer peripheral speed of the impeller being 0.1 m/sec. The agitation strength within the blanket layer was 0.004 kg-m/m³sec. The water obtained by this treatment had the following qualities: pH, 6.5; suspended solids, 10 ppm; COD, 11 ppm; BOD 5 ppm.

As is evident, the quality of the water is greatly improved by the treatment.

TEST 5-A

A mother liquor having the composition of that used in Example 5 was transferred through the vessel under the same conditions except that the upward flow velocity was increased to 450 mm/min. The concentration of solids within the blanket layer fell rapidly and after 30 minutes it dropped below 1 g/l. Separation of solids from the water became impossible and the quality of the treated water deteriorated greatly.

The optimum particle concentration in the blanket layer, namely, the granulation zone, varies substantially with the type of solids being treated. Where the colloidally-suspended solid material is a clay or is of clay-type, the optimum concentration in the blanket layer is 30 to 150 g/l, but where the water is secondary treated sewage so that the colloidal material is primarily organic, the optimum concentration is generally 1 to 10 g/l. More generally, it can be stated that the optimum particle concentration in the blanket layer is in the range of 3 times the solids concentration of the inflowing water up to 150 g/l.

As has hereinbefore been described in detail, the process of the present invention comprises providing a mother liquor consisting of a colloidal suspension having a solids concentration of less than 10 g/l, adding thereto an inorganic metal salt flocculating agent in an amount sufficient to effect the coagulation of the colloidally-suspended solids, holding said mother liquor with or without agitation for a period sufficient for coagulation to occur, immediately thereafter adding thereto at least 0.5 ppm of an organic high molecular weight flocculating agent maintaining the solids concentration in the suspension at at least 1 g/l, generating a rotational flow inside a vessel containing said liquid by means of a stirring blade or the like, imparting an upward rotational flow to the particles to effect an intimate particle-liquid contact for thereby granulating the suspended particles, the agitation strength being in the range from 0.001 to 1.0 kg-m/m³ sec., collecting granules formed in the upward flow, separating the upwardly flowing liquid from the suspension as a supernatant and extracting the solid suspended matter as granules having excellent condensability and hydroextraction capability.

Further, the apparatus employed in the process of this invention is easy to operate, can be compactly set up, and economically fabricated.

Moreover, the process of the present invention, together with the apparatus therefor, substantially eliminates any residual high molecular weight flocculating agent from the treated water, thereby preventing possible secondary pollution and also simplifies sludge post-treatment procedures.

Thus, the present invention provides various industrial advantages that can never be expected of conventional flocculation-and-precipitation methods.

It will thus be seen that the objects set forth above, among those made apparent from the preceding description, are efficiently attained, and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A water-clarification process for separating colloidally-suspended solids from a mother liquor containing less than 10 g/l of said colloidally-suspended solids, comprising the steps of adding to said mother liquor an inorganic metal salt flocculating agent, hereinafter referred to as "IFA" in an amount sufficient for coagulating said solids, holding said IFA-treated mother liquor for a period sufficient for completion of coagulation, adding to said mother liquor containing coagulated solids immediately after completion of coagulation a high molecular weight organic flocculating agent, hereinafter referred to as "OFA", said OFA being selected from the group of polymers consisting of polyacrylamide, partially hydrolyzed polyacrylamide, and sodium polyacrylate, said polymer having a molecular weight between 500,000 and 6,000,000, introducing essentially the entire quantity of said IFA- and OFA-treated mother liquor into an apparatus for upward flow therethrough, said apparatus having in the lower section thereof a blanket layer of granulated solids formed from said coagulated solids, the solids concentration in said blanket layer lying between a lower limit of 3 times that of the colloidally-suspended solids in said mother suspension and an upper limit of 150 g/l, agitating said mother liquor to impart a rotational flow of said mother liquor at a rate sufficient to bring said coagulated solids in mutual contact and form said granulated solids, said agitation rate being below that at which said blanket is disrupted, and said agitation being effected by impellers rotating about a vertical shaft with a tip speed between 0.05 and 0.7 m/sec, drawing off said granulated solids from said blanket layer at a rate such as to maintain the concentration of granular solids in said blanket layer within said limits, and drawing off clarified water above said blanket layer, said OFA being added in an amount effective in combination with said agitation for granulating said coagulated solids.

2. The water-clarification process as defined in claim 1, wherein said IFA is selected from the group consisting of aluminum sulfate, polyaluminum chloride, ferric sulphate, ferric chloride, ferrous sulphate and magnesium carbonate.

3. The water-clarification process as defined in claim 1, wherein the quantity of IFA added is between 5 and 300 ppm.

4. The water-clarification process as defined in claim 1, wherein the quantity of OFA added is between 0.5 and 20 ppm.

5. The water-clarification process as defined in claim 1, wherein said mother liquor is agitated during said holding period.

6. The water-clarification process as defined in claim 1, wherein the solids concentration in said blanket layer is maintained in the range from about 1 g/l to about 150 g/l.

7. The water-clarification process as defined in claim 1, wherein the agitation strength of said impeller lies between 0.001 and 1.0 kg-m/m$^3$ sec.

8. The water-clarification process as defined in claim 1, wherein the rate of upward flow of said treated liquor in said apparatus is between 200 and 2000 mm/min.

9. The water-clarification process as defined in claim 1, further comprising the step of diluting said mother liquor prior to said addition of IFA in order to bring the concentration of said colloidally-suspended solids to below 10 g/l, whereby a mother liquor having a concentration of colloidally-suspended solids of 10 g/l or greater can be brought to a concentration range suitable for treatment in accordance with said process.

10. The water-clarification process as defined in claim 1, further comprising the step of dispersing in said mother liquor prior to said treatment with IFA an effective amount of a substantially hydrophobic water-insoluble particulate material having a specific gravity of at least 1 and a particle size of up to and including 200 microns, said dispersing step being of assistance in granulating particularly hydrophilic solids.

11. The water-clarification process as defined in claim 10, wherein the average particle size of said hydrophobic particulate material is from about 30 to about 200 microns.

12. The water-clarification process as defined in claim 10, wherein said hydrophobic particulate material is selected from the group consisting of sand, clay, carbon, activated carbon, fly ash, and powdered synthetic resin.

13. The water-clarification process as defined in claim 10, wherein said amount of hydrophobic particulate material is at least 10% of the weight of colloidally-suspended solids.

* * * * *